(12) United States Patent
Ishikawa et al.

(10) Patent No.: US 11,972,509 B2
(45) Date of Patent: Apr. 30, 2024

(54) LOCAL GONIO-REFLECTION CHARACTERISTICS-ACQUIRING METHOD, IMAGE PROCESSING METHOD, IMAGE DISPLAY METHOD, AND LOCAL GONIO-REFLECTION CHARACTERISTICS-ACQUIRING APPARATUS

(71) Applicant: Konica Minolta, Inc., Tokyo (JP)

(72) Inventors: Takayuki Ishikawa, Saitama (JP); Akihiko Itami, Tokyo (JP)

(73) Assignee: KONICA MINOLTA, INC., Tokyo (JP)

( * ) Notice: Subject to any disclaimer, the term of this patent is extended or adjusted under 35 U.S.C. 154(b) by 522 days.

(21) Appl. No.: 17/371,773

(22) Filed: Jul. 9, 2021

(65) Prior Publication Data

US 2022/0036601 A1    Feb. 3, 2022

(30) Foreign Application Priority Data

Jul. 30, 2020    (JP) .................................. 2020-129331

(51) Int. Cl.
| | | |
|---|---|---|
| *G06T 11/00* | (2006.01) | |
| *G01N 21/57* | (2006.01) | |
| *H04N 1/00* | (2006.01) | |
| *H04N 1/23* | (2006.01) | |

(52) U.S. Cl.
CPC ............ *G06T 11/001* (2013.01); *G01N 21/57* (2013.01); *H04N 1/00806* (2013.01); *H04N 1/00816* (2013.01); *H04N 1/233* (2013.01); *H04N 1/2392* (2013.01); *G01N 2021/575* (2013.01)

(58) Field of Classification Search
USPC ......................................................... 358/1.9
See application file for complete search history.

(56) References Cited

FOREIGN PATENT DOCUMENTS

| JP | 2010-114506 A | 5/2010 |
| JP | 2013-182417 A | 9/2013 |

*Primary Examiner* — Jacky X Zheng
(74) *Attorney, Agent, or Firm* — Lucas & Mercanti, LLP

(57) ABSTRACT

Method for acquiring local gonio-reflection characteristics of an image which is aggregation of dots. Sensory glossiness (L) of the image determined by equation (1) is 1.0 or more. The sensory glossiness (L) is determined based on a height of a peak (H), a height of a base (B) and a half width of a peak (W) of a distribution information of lightness with respect to light receiving angle, obtained by measuring reflected light of a measuring light irradiated into the image. The local gonio-reflection characteristics is acquired with a spatial resolution (A) for acquiring the local gonio-reflection characteristics and a resolution (B) which represents a distribution information of the dots within a region where the sensory glossiness (L) being 1.0 or more, satisfying formula (2).

$L=\text{Log}((H-B)/W)$    Equation (1)

$0.8 < A/B < 10$    Formula (2)

18 Claims, 4 Drawing Sheets

LOCAL GONIO-REFLECTION CHARACTERISTICS-ACQUIRING METHOD, IMAGE PROCESSING METHOD, IMAGE DISPLAY METHOD, AND LOCAL GONIO-REFLECTION CHARACTERISTICS-ACQUIRING APPARATUS

CROSS REFERENCE TO RELATED APPLICATIONS

The entire disclosure of Japanese Patent Application No. 2020-129331 filed on Jul. 30, 2020, is incorporated herein by reference in its entirety.

BACKGROUND

Technological Field

The present invention relates to a local gonio-reflection characteristics-acquiring method, an image processing method, an image display method, and a local gonio-reflection characteristics-acquiring apparatus.

Description of Related Art

When producing images for use in labels, packages, publications and so on, it is desirable that color tone and so on of the image to be formed be recognized in common between contractee for determining color tone of an image to be formed and contractor for producing the image with the determined color tone. For example, information concerning color tone can be represented by CIE Lab color space L*, a* and b* numeric values, and numeric values such as R, G, and B in the RGB color model and so on, with which the information can be conveyed and shared among the participants. By these numeric information, even when contractee and contractor are located at distant locations, the same color tone can be displayed on the display on both of them, and the recognition of the image to be expressed can be shared.

When an image having gloss tone is to be formed, it is desirable that the difference in texture derived from the difference gloss is also communicated and shared among each participant so that it can be displayed on the display equally even at a distant location.

As a method of sharing texture of an image, Japanese Patent Laid-Open No. 2010-114506 describes a display control system having a texture information data acquiring device for acquiring texture information data representing texture of the surface of a printed material, and an image display data deriving device for deriving an image display data for image display from the texture information data. In JP 2010-114506, the texture information data acquire device acquires texture information data that can be represented by the bi-directional reflect rate distribution function (Bidirectional Reflectance Distribution Function: BRDF). According to the document, BRDF is a data describing physical quantity of the relationship between the incident light and reflected light, with respect to the observation point (one point on the image), the relationship being hemispherical omnidirectionally described. The display control system described in the document stores a correspondence between an amount of a print recording material used for printing and BRDF data of images formed by the amount of the print recording material, prepared in advance. Then, on the basis of the print data indicating the amount of the print recording material used at the time of printing, referring to the correspondence, texture information data is acquired JP 2013-182417 discloses filtering local gonio-reflection characteristics of the surface of the object according to a difference between an actual distance between the output device and the observer and a virtual distance indicating how far the object is displayed on the output device so as to be at a distance away from the observer. In JP 2013-182417, specifically, resolution of the image displayed is controlled based on the difference of: the observation angle corresponding to the actual distance; and the observation angle corresponding to the virtual distance, so that visual recognizability that matches the observing distance can be reproduced.

SUMMARY

As described above, various methods have been proposed for more accurately displaying texture of images. However, according to the findings of the present inventors, even in the methods described in these documents, when a texture of an image which is aggregation of dots and has a large gloss is to be reproduced, the reproductivity of the texture (perceived glossiness) is not high.

In view of the problems, it is an object of the present invention to provide a local gonio-reflection characteristics-acquiring method for an image which is aggregation of dots and having a large gloss, with which a reproductivity of the texture (glossiness) of the image can be enhanced; image processing method and image displaying method using the local gonio-reflection characteristics-acquiring method; and a local gonio-reflection characteristics-acquiring apparatus for implementing the local gonio-reflection characteristics-acquiring method.

The Local gonio-reflection characteristics-acquiring method acquires local gonio-reflection characteristics of an image which is aggregation of dots. Sensory glossiness (L) of the image determined by equation (1) is 1.0 or more, the sensory glossiness (L) being determined based on a height of a peak (H), a height of a base (B) and a half width of a peak (W) of a distribution information of lightness with respect to light receiving angle, and the distribution information being obtained by measuring reflected light of a measuring light irradiated into the image. The local gonio-reflection characteristics is acquired with a spatial resolution (A), wherein when the spatial resolution (A) is a spatial resolution when the local gonio-reflection characteristics is acquired and when the resolution (B) represents a distribution information of the dots within a region where the sensory glossiness (L) being 1.0 or more, the spatial resolution (A) and the resolution (B) satisfying formula (2).

$$L=\mathrm{Log}((H-B)/W) \qquad \text{Equation (1)}$$

$$0.8 < A/B < 10 \qquad \text{Formula (2)}$$

BRIEF DESCRIPTION OF DRAWINGS

The advantageous and features provided by one or more embodiments of the invention will become more fully understood from the detailed description given hereinbelow and the appended drawings which are given by way of illustration only, and thus are not intended as a definition of the limits of the present invention:

FIG. 4B is a graph illustrating a state of the.

DETAILED DESCRIPTION OF EMBODIMENTS

Hereinafter, one or more embodiments of the present invention will be described with reference to the drawings. However, the scope of the invention is not limited to the disclosed embodiments.

One embodiment of the present invention relates to an image display system for acquiring and reproducing a local gonio-reflection characteristics of a an image formed by collecting fine dots (hereinafter, simply referred to as "dot-image"), in order to reproduce a texture of the dot-image on another display, and a local gonio-reflection characteristics acquiring method and an image processing method.

More specifically, in this embodiment, local gonio-reflection characteristics of an image in which sensory glossiness (L) determined by the equation (1) is 1.0 or more is acquired, with a spatial resolution (A) and a resolution (B) satisfying the formula (2), in which the resolution (B) represents a distribution information of the dots within the region where the sensory glossiness (L) being 1.0 or more. The sensory glossiness (L) being determined based on a height of a peak (H), a height of a base (B) and a half width of a peak (W), of a distribution information of lightness with respect to light receiving angle, and the distribution information being obtained by measuring reflected light of a measuring light irradiated into the image.

$$L = \mathrm{Log}((H-B)/W) \quad \text{Equation (1)}$$

$$0.8 < A/B < 10 \quad \text{Formula (2)}$$

Note that, as shown in the Examples described later, improvement in reproductivity of an image to a display by acquiring a local gonio-reflection characteristics by the present method is remarkable for an image in which sensory glossiness (L) is 1.2 or more, more remarkable for an image in which sensory glossiness (L) is 1.5 or more, even more remarkable for an image in which sensory glossiness (L) is 1.8 or more, and particularly remarkable for an image in which sensory glossiness (L) is 2.0 or more.

In addition, as shown in the Examples described later, improvement in reproductivity of images on a display by acquiring local gonio-reflection characteristics by the present method is remarkable when A/B is set to be greater than 1.0 and less than 8.0, more remarkable when it is set to be greater than 1.5 and less than 8.0, and even more remarkable when it is set to be greater than 2.0 and less than 5.0.

[Image Display System and Acquiring Methods and Image-Processing Methods of Local Gonio-Reflection Characteristics]

Figure 1:
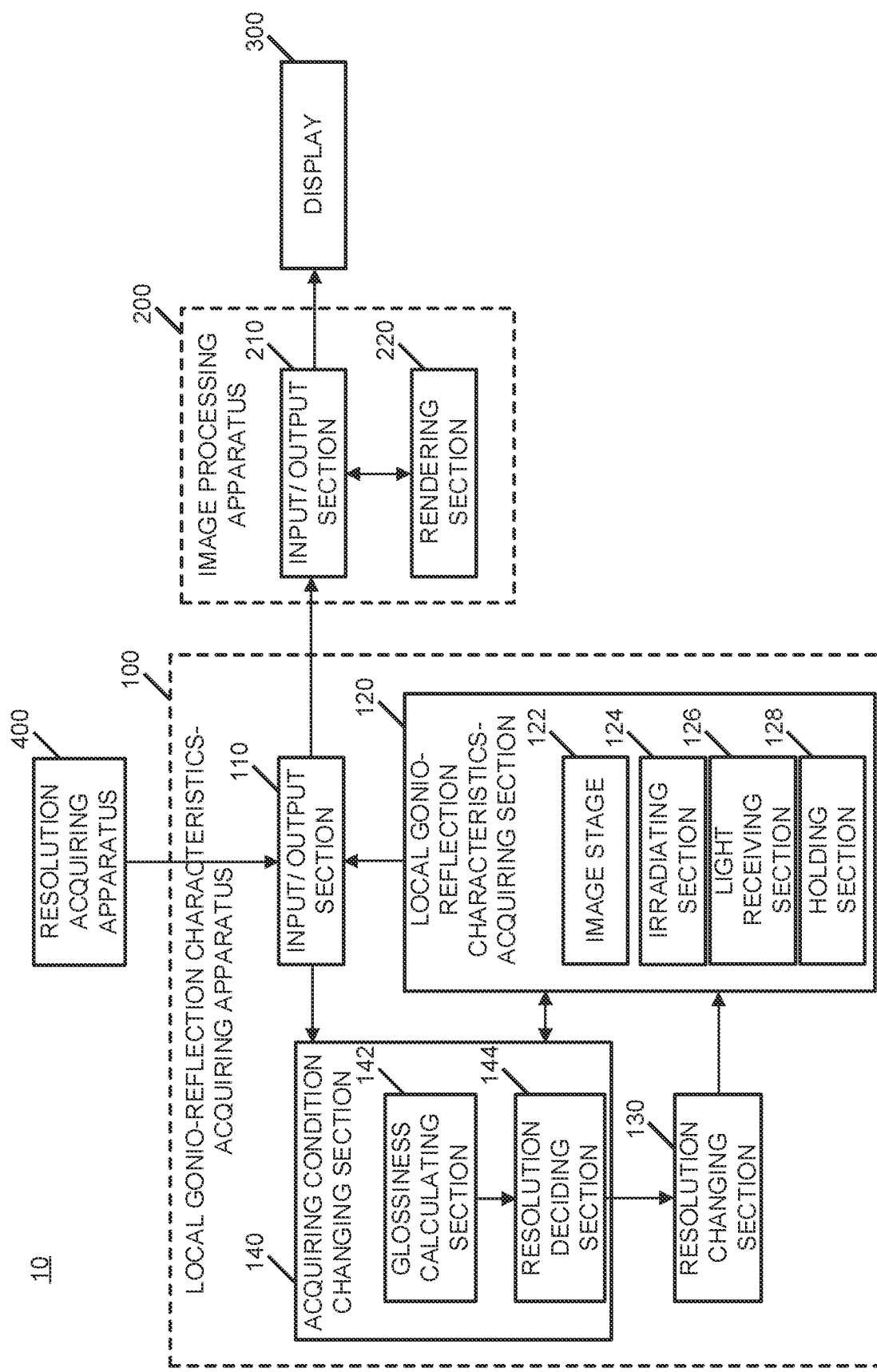
FIG. 1 is a block diagram illustrating an outline of an image display system relating to an embodiment of the present invention.
Figure 2:
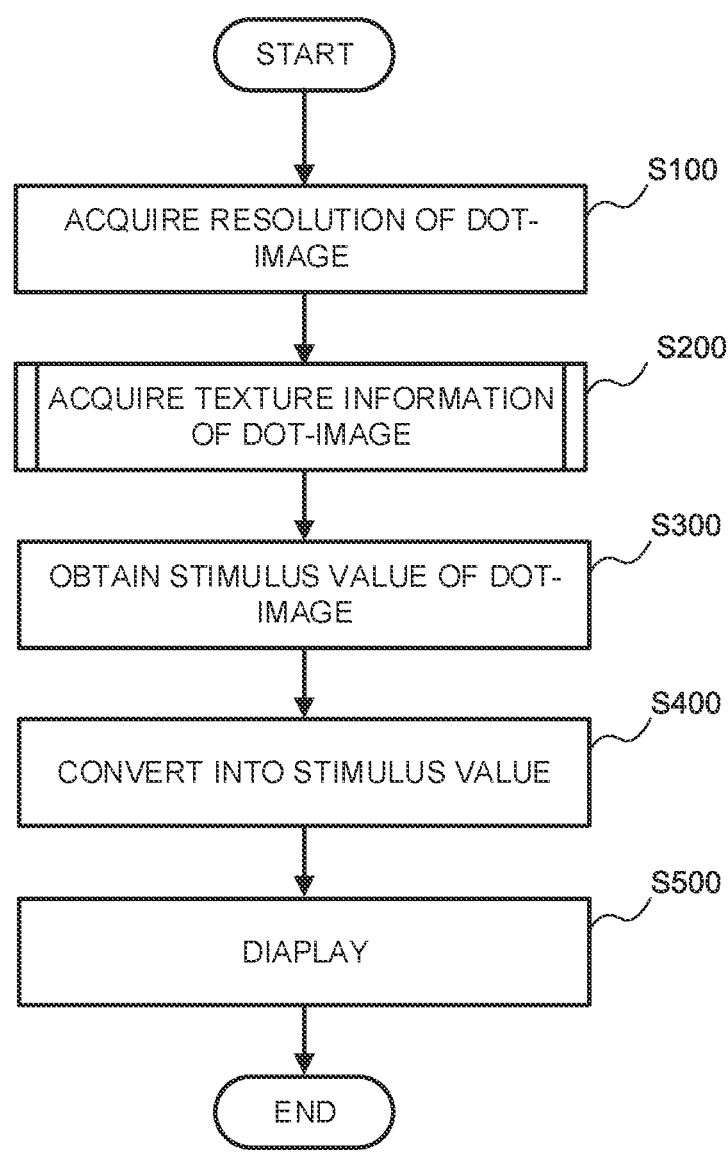
FIG. 2 is a flow chart of local gonio-reflection characteristics acquiring method and image processing method of using the image display system.
Figure 3:
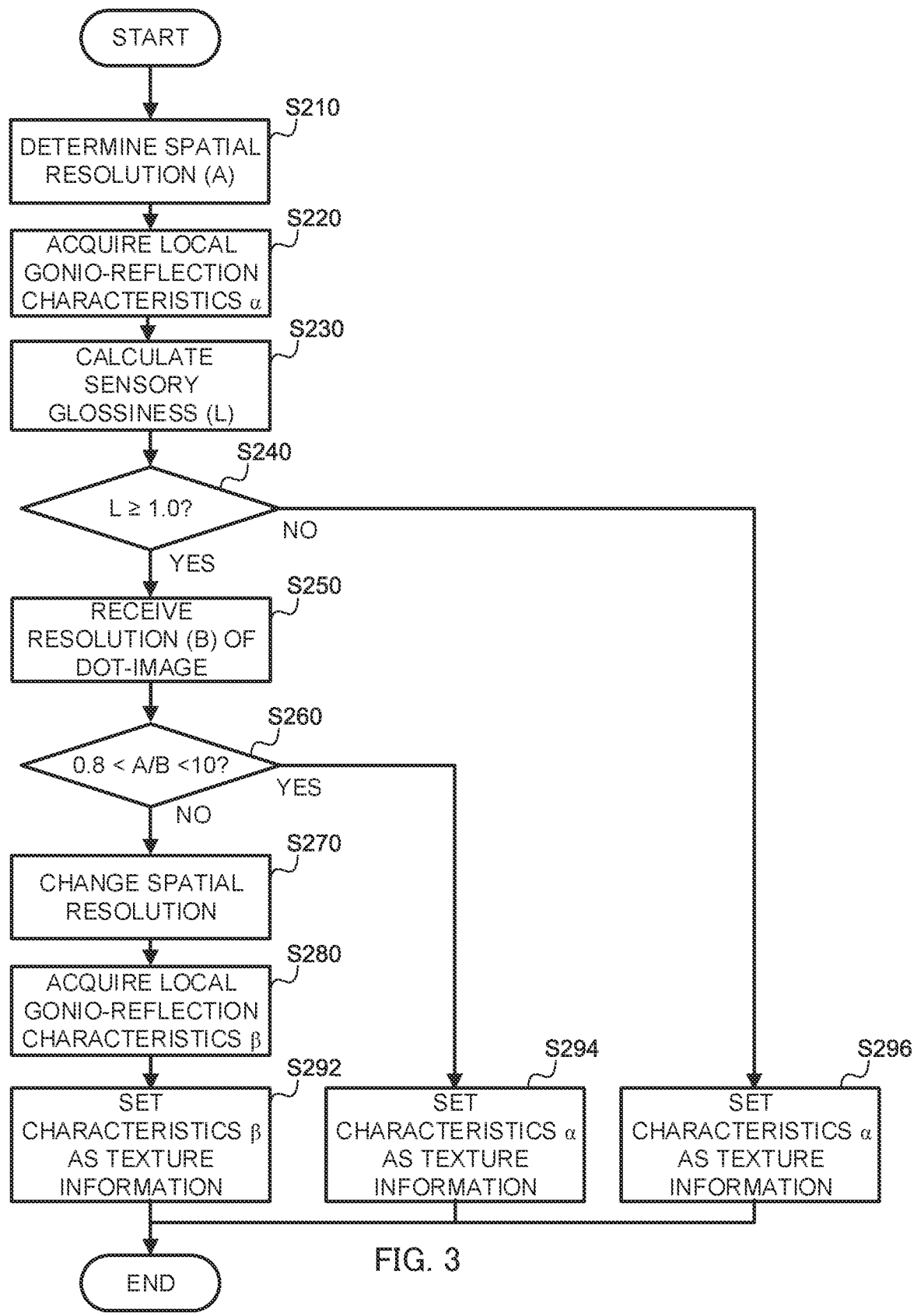
FIG. 3 is a partial flow chart illustrating a detailed view of acquiring of texture information (process S200) shown in the flow chart of FIG. 2.

FIG. 1 is a block diagram illustrating an outline of an image display system 10 relating to this embodiment; FIG. 2 is a flow chart local gonio-reflection characteristics of acquiring method and image processing method of using image display system 10, and FIG. 3 is a partial flow chart illustrating a detailed view of acquiring of texture information (process S200) shown in the flow chart of FIG. 2.

Image display system 10 has a local gonio-reflection characteristics-acquiring apparatus 100, image processing apparatus 200 and a display 300, and may further have a resolution acquiring apparatus 400.

Note that, although not shown in the figures, local gonio-reflection characteristics-acquiring apparatus 100 and image processing apparatus 200 include, for example, a storage medium such as a Read Only Memory (ROM) in which a control program is stored, a working memory such as a Random Access Memory (RAM), and a communication circuit. At this time, the function of each of the processing units possessed by local gonio-reflection characteristics-acquiring apparatus 100 and image processing apparatus 200 is realized by the processor performing the control program (corresponding to the "acquire condition determination program of local gonio-reflection characteristics of the present invention").

Local gonio-reflection characteristics-acquiring apparatus 100 acquires local gonio-reflection characteristics of a dot-image to acquire its texture characteristics. In this embodiment, local gonio-reflection characteristics-acquiring apparatus 100 acquires, as a texture information, acquire local gonio-reflection characteristics which is a property indicating a variance of a reflect rate of light incident on dot-image that varies with the incident-reflect angle.

Local gonio-reflection characteristics-acquiring apparatus 100 has input/output section 110, local gonio-reflection characteristics-acquiring section 120, resolution changing section 130, and acquiring condition determining section 140.

Input/output section 110 is connected to an outer apparatus (in this embodiment, image processing apparatus 200 and resolution acquiring apparatus 400) and mediates the transmission and reception of data between outer apparatus and local gonio-reflection characteristics-acquiring apparatus 100. Input/output section 110 may comprise, for example, any of a variety of serial interfaces, any of a variety of parallel interfaces, or a combination thereof.

Local gonio-reflection characteristics-acquiring section 120 acquire local gonio-reflection characteristics of the dot-image. Local gonio-reflection characteristics-acquiring section 120 has an image stage 122 which holds the dot-image, an irradiating section 124 which irradiates the dot-image hold on the image stage, a light receiving section 126 which receives a reflected light formed by reflection of a measurement light incident on the dot-image, and a holding section 128 which holds light receiving section 126 such that the position of the light receiving section 126 for receiving dot-image can be changed. In local gonio-reflection characteristics-acquiring section 120, holding section 128 moves light receiving section 126 to rotate circumferentially or spherically around dot-image, or irradiating section 124 changes the incident angle of measurement light on dot-image, to thereby measure the reflect light of the measurement light incident on the dot-image of each incident-reflect angle.

In this embodiment, local gonio-reflection characteristics-acquiring section 120 acquires, as local gonio-reflection characteristics, distribution of a lightness with respect to angles of the reflected light, and spectral reflectivity, of the reflected light received by light receiving section 126. For example, local gonio-reflection characteristics-acquiring section 120 may be configured to use a hyperspectral camera with a grating or prism in a known goniophotometer as light receiving section 126.

Local gonio-reflection characteristics-acquiring section 120 may acquire any local gonio-reflection characteristics such as a bi-directional reflect rate distribution function (BRDF), a bi-directional texture function (BTF), and a bidirectional scattering surface reflect rate distribution function (BSSRDF) as a distribution of a lightness of a reflected light with respect to an angle of the reflected light. In this embodiment, local gonio-reflection characteristics-acquiring section 120 acquires a local gonio-reflection characteristics represented by BRDF (angular distribution of lightness (reflect ratio)) as the distribution of lightness of reflected light.

Resolution changing section 130 changes spatial resolution when local gonio-reflection characteristics-acquiring section 120 acquires local gonio-reflection characteristics of the dot-image. In this embodiment, resolution changing section 130 has a configuration of, by changing the position of holding section 128 of local gonio-reflection characteristics-acquiring section 120, changing the distance (measurement distance) between image stage 122 and light receiving section 126. By changing the distance between image stage 122 and light receiving section 126, the spatial resolution is altered. The configuration of resolution changing section 130 is not limited thereto, and the spatial resolution may be changed by, for example, changing the focal position of the lens of light receiving section 126 or changing the size of the field of view of the image pickup device (such as a CCD image sensor).

In FIG. 1, resolution changing section 130 is described as a function unit independent of local gonio-reflection characteristics-acquiring section 120, but may be provided in local gonio-reflection characteristics-acquiring section 120 (such as a goniophotometer) and may be a part thereof.

Acquiring condition determining section 140 is a Central Processing Unit (CPU) as a processor, reads out a program for various control processing (for example, a acquire condition determination program of local gonio-reflection characteristics) stored in a storage medium such as a Read Only Memory (ROM), sets the program in a working memory such as a Random Access Memory RAM), executes to local gonio-reflection characteristics-acquiring section 120, and determines a spatial resolution to acquire local gonio-reflection characteristics of dot-image.

Acquiring condition determining section 140 has a function as glossiness calculating section 142 and resolution deciding section 144. Glossiness calculating section 142 calculates sensory glossiness (L) of dot-image from lightness of reflected light that local gonio-reflection characteristics-acquiring section 120 acquires. Resolution deciding section 144 decides spatial resolution (A) when local gonio-reflection characteristics-acquiring section 120 acquires the local gonio-reflection characteristics such that the spatial resolution (A) and resolution of the dot-image (B) satisfy a predetermined relationship.

In addition to operating as acquiring condition determining section 140, the processor also serves as a controlling section for collectively controlling the overall operation of local gonio-reflection characteristics-acquiring apparatus 100. For example, the processor controls the operation of resolution changing section 130 to acquire local gonio-reflection characteristics of dot-image at a spatial resolution determined by acquiring condition determining section 140 and to change spatial resolution at the time of acquire of local gonio-reflection characteristics according to local gonio-reflection characteristics-acquiring section 120. Further, the processor controls the operation of local gonio-reflection characteristics-acquiring section 120 to acquire local gonio-reflection characteristics of dot-image.

Image processing apparatus 200 converts (rendering) texture information acquired by local gonio-reflection characteristics-acquiring apparatus 100 into a display data for display 300, and transmits the display data to display 300.

Image processing apparatus 200 has input/output section 210 and rendering section 220.

Input/output section 210 is connected to an outer apparatus (in this embodiment, local gonio-reflection characteristics-acquiring apparatus 100 and display 300) and mediates the transmission and receiving of data between outer apparatus and image processing apparatus 200. Input/output section 210 may comprise, for example, any of a variety of serial interfaces, any of a variety of parallel interfaces, or a combination thereof.

Rendering section 220 is a Central Processing Unit (CPU) as a processor, reads out various control programs (for example, a acquire condition determination program) stored in a storage medium such as a Read Only Memory (ROM), sets the program in a working memory such as a Random Access Memory (RAM), executes the program, and converts (rendering) texture information transmitted from local gonio-reflection characteristics-acquiring apparatus 100 and received by input/output section 210 to an RGB signal value for image display.

In addition to operating as a rendering section 220, the processor also serves as a controlling section for collectively controlling the overall operation of image processing apparatus 200.

Display 300 is a display device such as a PC, a TV, or a smartphone, and displays an RBG signal value transmitted from image processing apparatus 200.

Resolution acquiring apparatus 400 is a microscope equipped with a CPU that executes image-processing software. Resolution acquiring apparatus 400 magnifies and observes a dot-image and acquires resolution of the dot-image.

In this embodiment, by image display system 10 provided with these composition, an image is data-ized and displayed by the flow shown in FIG. 2 and FIG. 3.

First, resolution acquiring apparatus 400 acquires resolution of a dot-image (step S100).

In this step, resolution acquiring apparatus 400 takes an image by magnifying and observing dot-image, processes the captured image, and acquire the number of dots per inch (dpi) in the dot-image.

Next, local gonio-reflection characteristics-acquiring apparatus 100 acquires texture information of the dot-image (process S200). In this embodiment, as described above, local gonio-reflection characteristics-acquiring apparatus 100 acquires local gonio-reflection characteristics of the dot-image as the texture information.

FIG. 3 is a partial flow chart illustrating a detailed process of acquiring texture information. The flow chart of FIG. 3 is started while dot-image is disposed in image stage 122 of local gonio-reflection characteristics-acquiring section 120.

First, local gonio-reflection characteristics-acquiring section 120 and resolution changing section 130 determines a spatial resolution (A) for acquiring the local gonio-reflection characteristics of the dot-image, and changes the position of holding section 128 so that local gonio-reflection characteristics of the dot-image is acquired with the determined spatial resolution (A) step S210. The position of holding section 128 at this time may be a position which is set by default to local gonio-reflection characteristics-acquiring section 120 or a position at which local gonio-reflection characteristics is acquired last time. In this embodiment, in this step, the position of holding section 128 is a position which is set to local gonio-reflection characteristics-acquiring section 120 by default. With the spatial resolution (A) for acquiring local gonio-reflection characteristics at this position, A/B described above satisfies the following equation (3).

$$A/B \leq 0.8 \quad \text{Formula (3)}$$

Next, local gonio-reflection characteristics-acquiring section 120 acquires local gonio-reflection characteristics of the dot-image at a spatial resolution set in step S210 (step S220). The local gonio-reflection characteristics acquired at this step is defined as "local gonio-reflection characteristics α."

In this embodiment, irradiating section 124 irradiates measurement light at an angle of incidence of 45° with respect to dot-image disposed in image stage 122. Then, light receiving section 126 receives a reflected light of −20° to 80° while being rotated about dot-image by holding section 128. In this way, distribution of a lightness of a reflected light with respect to an angle of the reflected light (BRDF) can be obtained.

Next, glossiness calculating section 142, of acquiring condition determining section 140, calculates sensory glossiness (L) of the dot-image from distribution of a lightness of a reflected light with respect to an angle of the reflected light (BRDF) obtained by local gonio-reflection characteristics-acquiring section 120 (step S230).

In this step, sensory glossiness according to the following methods of the dot-image is defined for each pixel, and the mean of sensory glossiness per pixel is defined as sensory glossiness (L) of the dot-image.

Figure 4A:
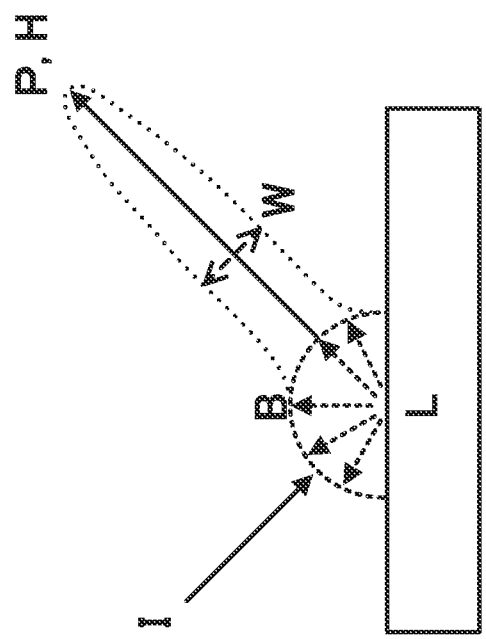
FIG. 4A is a schematic diagram illustrating a state in which a part of incident light incident on an object is turned into specular reflection and another part is turned into diffuse reflection.
Figure 4B:
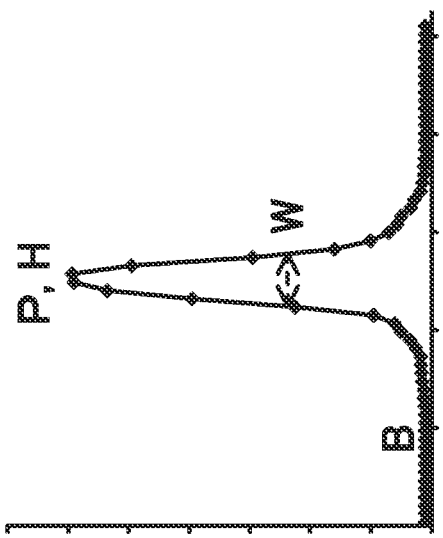

As shown in FIG. 4A, the incident light I incident on the object is partially turned into specular reflection light P, and partially turned into diffuse reflection light B (in FIG. 4A, lightness of specular reflection light P and diffuse reflection light B is indicated by the distance from the point L where the incident light I was incident (the length of the solid line arrow indicating the specular reflection light P and the length of the dashed line arrow indicating the diffuse reflection light B). Then, in the image where gloss is large, as shown in FIG. 4A, lightness of specular reflection light P is larger than lightness of diffuse reflection light B. Thus, as shown in FIG. 4B, base B derived from diffuse reflection at the irradiated portion as well as the peak P of lightness derived from specular reflection at the irradiated portion appears in distribution of a lightness of a reflected light (BRDF) obtained in this step.

In this step, from the height of a peak (H) of the peak P, a height of a base (B), and a half width of a peak (W) of the peak P, sensory glossiness (L) of dot-image is determined by the following equation (1)

$$L = \mathrm{Log}((H-B)/W) \quad \text{Equation (1)}$$

As described above, an image having a large gloss reflects most of the light incident on the object as a directed specular reflection. Thus, the spatial distribution of a light reflected by a glass color is highly directional, and the visually perception by the human body of the color tone of the glass image is considered greatly influenced by this directivity. Thus, in this embodiment, as in Equation (1), by using the degree of gloss reflecting the directionality of the spatial distribution of the reflected light as an index, visual perception of the gloss color by the human body is greatly reflected to the evaluation of the color tone.

Thereafter, resolution deciding section 144 determines whether or not sensory glossiness (L) obtained by Equation (1) is 1 or more (Step S240). When the sensory glossiness (L) is less than 1 (step S240: NO), because there is no problem for employing the spatial resolution set in the step S210, resolution deciding section 144 sets local gonio-reflection characteristics α measured in the step S220 as texture information of the dot-image for display on the display (step S296). Texture information (local gonio-reflection characteristics α) at this time is a texture characteristics in which A/B is acquire with a spatial resolution satisfying the following equation (3).

$$A/B \leq 0.8 \quad \text{Formula (3)}$$

On the other hand, when the obtained sensory glossiness (L) is 1 or more, texture of the original dot-image could not be sufficiently reproduced when local gonio-reflection characteristics of the dot-image is acquire by a conventional method, and the local gonio-reflection characteristics is subjected to rendering and displayed. This is considered to be due to the following reasons.

That is, when sensory glossiness (L) is 1 or more, the glossiness of the dot-image visually perceived by a human body is extremely high, since the extremely large portion of the light incident becomes specular reflection, and lightness of the specular reflection light P is extremely larger than lightness of the diffuse reflection light B. Consequently, the intensity of the light specular reflection by each dot is considered to be increased enough to be well recognized per each dot by human body. In other words, it is considered that a person who observes a dot-image having a sensory glossiness (L) of 1 or more perceives the dot image with a resolution such that each dot can be visually recognized. Furthermore, it is known that the sensitivity peak of the contrast sensitivity of lightness information is within a higher frequency range than that of color information, and it is believed that thus those who observe dot-image with a sensory glossiness (L) of 1 or more perception dot-image at very high resolution.

In order to reproduce visual recognizability of the dot-image with a high glossiness, local gonio-reflection characteristics of the dot-image should be acquired with a spatial resolution which approximately equal to or greater than the resolution of the dot-image.

On the other hand, according to the findings of the present inventors, reproductivity of the dot-image is lowered even when the spatial resolution for acquiring the local gonio-reflection characteristics of dot-image is too high. This is probably due to the large deviation between spatial resolution for acquiring local gonio-reflection characteristics and spatial resolution of the human eye, the large deviation resulting in an increase in the amount of information unnecessary for rendering and a rather decrease in reproductivity. In addition, when spatial resolution for acquiring local gonio-reflection characteristics is too high, the three-dimensional structure of imaging medium as well as the dot information is reflected in the local gonio-reflection characteristics, resulting in fluctuation of the specular reflection distribution between neighbouring dots. This fluctuation is reflected in an image displayed on a display as noise, resulting in decrement of reproductivity.

Based on these findings, in this embodiment, when it is determined that sensory glossiness (L) determined by Equation (1) is 1 or more (Step S240: YES), resolution deciding section 144 changes spatial resolution at the time of measuring local gonio-reflection characteristics to an appropriate range.

First, resolution deciding section 144 receives resolution (B) of dot-image that acquiring apparatus 400 acquired in the process S100, by input/output section 110 (step S250). Otherwise, resolution (B) of dot-image may be received previously and stored in a storage unit (not shown) of local gonio-reflection characteristics-acquiring apparatus 100, and may be acquired referring to the storage unit in this step.

Then, resolution deciding section 144 determines whether or not ratio of the spatial resolution (A) of when local gonio-reflection characteristics α is measured with respect to the resolution of dot-image (B) is within a predetermined range. In this embodiment, resolution deciding section 144 determines whether or not the ratio (A (ppi)/B (dpi)) is greater than 0.8 and less than 10 (step S260).

Then, when A/B is greater than 0.8 and less than 10 (step S260: YES), spatial resolution (A) at the time of measurement of acquiring local gonio-reflection characteristics α is a spatial resolution capable of displaying dot-image on the display with good reproductivity, and thus, resolution deciding section 144 sets local gonio-reflection characteristics α measured in the step S220 as a texture information of the dot-image used for display on the display (step S294).

On the other hand, when A/B is 0.8 or less or 10 or more (step S260: NO), spatial resolution (A) at the time of measurement of acquiring local gonio-reflection characteristics α is not a spatial resolution capable of displaying dot-image on the display with good reproductivity, and thus, resolution deciding section 144 changes spatial resolution of local gonio-reflection characteristics-acquiring section 120 to acquire local gonio-reflection characteristics (step S270)

Specifically, when A/B is 0.8 or less, spatial resolution (A) when local gonio-reflection characteristics α is measured in step S220 is too low with respect to spatial resolution when a person perceived the dot-image. Thus, resolution deciding section 144 controls resolution changing section 130 to let holding section 128 move such that light receiving section 126 of local gonio-reflection characteristics-acquiring section 120 approaches image stage 122. As such, resolution deciding section 144 enhances spatial resolution (A) when local gonio-reflection characteristics-acquiring section 120 acquires local gonio-reflection characteristics so that A/B is greater than 0.8 and less than 10.

On the other hand, when A/B is 10 or more, spatial resolution (A) when local gonio-reflection characteristics α is measured in step S220 is too high that noises are generated at the time of rendering. Thus, resolution deciding section 144 controls resolution changing section 130 to let holding section 128 move such that light receiving section 126 of local gonio-reflection characteristics-acquiring section 120 moves away from image stage 122. As such, resolution deciding section 144 lowers spatial resolution (A) when local gonio-reflection characteristics-acquiring section 120 acquires local gonio-reflection characteristics so that A/B is greater than 0.8 and less than 10.

Thereafter, local gonio-reflection characteristics-acquiring section 120 acquires local gonio-reflection characteristics of the dot-image at a spatial resolution set in the step S270 (step S280). The local gonio-reflection characteristics acquired at this step is defined as "local gonio-reflection characteristics β." Then, resolution deciding section 144 sets local gonio-reflection characteristics β measured in the process S280 as a texture information of the dot-image used for displaying on the display (process S292).

Input/output section 110 of local gonio-reflection characteristics-acquiring apparatus 100 transmits spectral reflectivity of texture information (process S200) obtained in this manner to image processing apparatus 200, together with spectrum of measurement light irradiated by irradiating section 124 of local gonio-reflection characteristics-acquiring section 120.

Next, image processing apparatus 200 converts (rendering) spectral reflectivity received by input/output section 210 into a display data for display 300.

Specifically, rendering section 220 of image processing apparatus 200 obtains a stimulus value (in this embodiment, XYZ stimulus value) representing the appearance of dot-image from spectrum S (λ) of the light source, color-matching function x⁻ (λ), and spectral reflectivity R (λ) by the following equation (4) (step S300).

[Mathematical formula 1]

$$X = K \int_{380}^{780} S(\lambda)\bar{x}(\lambda)R(\lambda)d\lambda$$

$$Y = K \int_{380}^{780} S(\lambda)\bar{y}(\lambda)R(\lambda)d\lambda \qquad \text{Formula (4)}$$

$$Z = K \int_{380}^{780} S(\lambda)\bar{z}(\lambda)R(\lambda)d\lambda$$

Then, rendering section 220 converts XYZ stimulus value obtained in step S300 into a RGB signal value for display by the following equation (5) (step S400).

[Mathematical formula 2]

$$\begin{pmatrix} R' \\ G' \\ B' \end{pmatrix} = \begin{pmatrix} 3.241 & -1.537 & -0.499 \\ -0.969 & 1.876 & 0.042 \\ 0.056 & -0.204 & 1.057 \end{pmatrix} \begin{pmatrix} X \\ Y \\ Z \end{pmatrix}, \qquad \text{Formula (5)}$$

$$\begin{pmatrix} sR \\ sG \\ sB \end{pmatrix} = \begin{pmatrix} R'^{0.45} \\ G'^{0.45} \\ B'^{0.45} \end{pmatrix},$$

Finally, image processing apparatus 200 sends the thus obtained RGB signal value from input/output section 210. Then, the display 300 receives and displays RGB signal value (step S500).

In spite of the fact that the measured dot-image has a sensory glossiness (L) of 1 or more and a indicates a very high gloss, texture (perceived glossiness) reproductivity of the dot-image displayed on the display 300 in this manner has been increased. This is considered to be due to acquiring of local gonio-reflection characteristics of the dot-image having sensory glossiness (L) of 1 or more at a spatial resolution that matches human perception and recognition of the dot-image.

[Images Obtained by Aggregation of Dots (Dot-Image)]

The dot-image can be an image formed by an aggregation of minute dots.

Dot-image is an image with a large number of dots including glossy colorants. Such a dot-image can be obtained by forming an ink jet ink or a toner containing glossy colorant, or by adhering particles of glossy colorant to a surface of a resin-based image formed by an ink jet ink, a toner, or the like.

The dot-image is an image in which sensory glossiness (L) calculated by the above-described method becomes 1 or more. The dot-image may be an image in which a region having a gloss and a region having no gloss are combined, or an image having a plurality of regions in which sensory glossiness (L) differs among the regions having a gloss. A plurality of regions having different sensory glossiness (L) can be formed in a manner in which the amount of glossy colorant imparted at the time of forming dot-image is changed from region to region.

The dots may be any fine dots formed by an ink jet ink or a toner. The size (major diameter) of one dot is not limited, but is preferably 1 μm or more and 200 μm or less, more preferably 10 μm or more and 150 μm or less, and still more preferably 20 μm or more and 100μ or less.

From the viewpoint of enhancing the adhesiveness of glossy colorant, it is preferable that dot-image has a laminated structure in which imaging medium, under layer, and metallic layer which contain glossy colorant are laminated in this order. For example, when a dot-image is formed by an ink jet ink or a toner containing glossy colorant, an under layer is formed by an under layer agent (pre-coating agent), and an ink jet ink or a toner containing glossy colorant is applied to the surface side (opposite to imaging medium) of the under layer to form a metallic layer. Alternatively, when particles of glossy colorant are adhered to the surface of resin-based image, particles of glossy colorant may be applied to the surface of resin-based image melted or softened by heating to form a metallic layer.

Note that the under layer differs from the coating layer previously formed on imaging medium. For example, the under layer is formed only in an image forming region on which a dot-image is formed and not in a non-image region on which a dot-image is not formed among the surfaces of imaging medium. The under layer can be confirmed by observations by scanning electronic microscope (SEM) or the like.

(Formation of Dot-Image by Inkjet Ink or Toner Containing Glossy Colorant)

When a dot-image is formed by an ink jet ink or a toner containing glossy colorant, the under layer agent may be a treatment liquid capable of forming a under layer made of resin on a surface of a imaging medium. For example, the under layer agent may be a treatment liquid containing a water-soluble resin or a resin emulsion, or may be a treatment liquid containing a compound (such as a monomer, an oligomer, and a prepolymer) which polymerizes and cross-links by actinic radiation or irradiate of heat. In this specification, actinic radiation may be an electron beam, an ultraviolet ray, an α ray, a γ ray, an X-ray, or the like, and is preferably an electron beam or an ultraviolet ray, and more preferably an ultraviolet ray.

Glossy colorant for forming metallic layer is preferably metal nano particles when a dot-image is formed by an ink jet ink or a toner containing glossy colorant. Metal nano particles is a spherical particle of nanosize (average particle size (D50) of 1000 nm or less) mainly composed of metal or metal oxide.

Examples of the metal or metal oxide constituting metal nano particles include gold, silver, copper, nickel, palladium, platinum, aluminum, zinc, chromium, iron, cobalt, molybdenum, zirconium, ruthenium, iridium, tantalum, mercury, indium, tin, lead, and tungsten or oxides thereof. Of these, from the view point of expressing a high gloss and cheapness, gold, silver, copper, nickel, cobalt, tin, lead, chromium, zinc and aluminum are preferred, gold, silver, copper, tin, chromium, lead and aluminum are more preferred, gold and silver are more preferred, and silver is particularly preferred. One kinds of these metals or metal oxides may be used alone or two or more kinds thereof may be used as an alloy or a mixture. In addition, two or more types of metal nano particles having different types or compositions of metals or metal oxides may be used in combination. Metal nano particles may be mainly composed of these metals, and may contain a trace amount of other components inevitably contained, or may be surface-treated with citric acid or the like to enhance dispersion stability.

Although average particle size (D50) of metal nano particles is not particularly limited, from the viewpoint of enhancing dispersion stability and storage stability in the metallic ink and from the viewpoint of enhancing visual recognizability of gradation, it is preferably 5 nm or more and 100 nm or less, more preferably 10 nm or more and 80 nm or less, still more preferably 10 nm or more and 60 nm or less, still more preferably 15 nm or more and 55 nm or less, and particularly preferably 20 nm or more and 30 nm or less. Further, the average value of the aspect ratio (ratio of major diameter/minor diameter) of metal nano particles is preferably less than 2.0, more preferably 1.2 or less, and particularly preferably 1.1 or less.

Average particle size of metal nano particles is measured by observing dispersions of metal nano particles by SEM and determining the volume average particle size of nanoparticles. The mean aspect ratio of metal nano particles is also determined by SEM-observation of metal nano particles dispersions. Specifically, it is carried out by the following procedure.

1) After applying the dispersion liquid on a glass plate, the dispersion liquid is vacuum degassed to volatilize the solvent component to obtain a sample. The dispersions of the obtained samples were observed by SEM using a scanning electron microscope JSM-7401F (manufactured by Nippon Electronics Co., Ltd.) to measure the particle sizes of any 300 metal nano particles.

2) Based on the obtained measure data, obtaining the particle size distribution of the volume basis using the image processing software Image J, the average particle size of the D50 (median diameter) in terms of volume (volume average particle size). Similarly, by using an image processing soft Image J, obtaining an aspect ratio of an arbitrary particle is, and calculating an average value thereof.

The ink jet ink containing metal nano particles can have the same configuration as that of a known ink jet ink except that it contains metal nano particles as a coloring material. The ink jet ink may be a actinic radiation curable ink which contains a compound (such as a monomer, an oligomer, and a prepolymer) which polymerizes and crosslinks by actinic radiation or thermally irradiate, and optionally contains a polymerization initiator, and cures by irradiation of actinic radiation, or may be an aqueous or solvent-based ink containing water or an organic solvent as a liquid component.

The toner containing metal nano particles may have the same configuration as the known toner except that it contains metal nano particles as a coloring material. The toner can be a known toner for developing an electrostatic charge image comprising toner base particles containing a fixing resin and a releasing agent, and an external additive. The toner for developing an electrostatic charge image may be a one component developer or a two component developer further comprising carrier particles.

From the viewpoint of further enhancing brilliantness of dot-image, metallic layer preferably contains 80% by mass or more of metal nano particles, more preferably contains 90% by mass or more of metal nano particles, and still more preferably contains 95% or more of metal nano particles, based on the total mass of metallic layer. The upper limit of the content of metal nano particles contained in metallic layer is not particularly limited, but can be set to less than 100% by mass, and is preferably 99% by mass or less.

From the viewpoint of setting the amount of metal nano particles contained in metallic layer within the range, metallic layer is preferably formed by an aqueous or solvent-based ink jet ink, and is preferably formed by an aqueous-based ink jet ink.

In addition to the under layer and metallic layer, dot-image may have an overcoat to protect metallic layer on the surface-side of metallic layer (opposite imaging medium). The overcoat can be formed by a treatment liquid similar to that of under layer.

(Formation of Dot-Image by Attaching Glossy Colorant Particles to the Surface of Resin-Based Image)

When particles of glossy colorant are adhered to the surface of resin-based image to form a dot-image, resin-based image may be an image formed by aggregation of dots formed by a known toner or actinic radiation curable ink. By heating and softening these resin-based image to impart particles of glossy colorant to the surface thereof, it is possible to form a dot-image in which particles of glossy colorant are adhered to the surface of resin-based image.

At this time, it is preferable that the particles of glossy colorant constituting metallic layer are flat-shaped particles. The flat-shaped particles can be arranged substantially parallel to the surface of resin-based image, thereby further enhancing brilliantness of dot-image. For the sake of particles having a flat shape being easily arranged substantially parallel to the surface of resin-based image, it is preferable to rub the surface of resin-based image to which particles having a flat shape are adhered, or to impart particles having a flat shape to a surface of a roller or a belt, rub them, and orient them in parallel to the surface, and then impart them to resin-based image.

In this specification, a flat-shaped particle means a particle having a shape in which a ratio of a minor diameter to a thickness is 5 or more when a maximum length in particles of a powder is defined as a major diameter, a maximum length in a direction orthogonal to a major diameter is defined as a minor diameter, and a minimum length in a direction orthogonal to a the major diameter is defined as a thickness.

The thickness of the flat-shaped particles is preferably 0.2 µm or more and 10 µm, and more preferably 0.2 µm or more and 3.0 µm or less. When the thickness is 0.2 µm or more, brilliantness of dot-image can be further increased. When the thickness is 10 µm or less (preferably 0.3 µm or less), the flat-shaped particles adhering to resin-based image hardly peel off.

It is preferable that the particles of the glossy colorant are also particles mainly composed of metal or metal oxide. The type of metal and metal oxide can be the same as that of metal nano particles described above.

Again, the dot-image may have, in addition to the under layer and metallic layer, an overcoat to protect metallic layer on the surface-side of metallic layer (opposite imaging medium). The overcoat can be formed by the same treatment liquid as in the case of forming a dot-image by an ink jet ink containing glossy colorant or a toner.

Other Embodiments

Each of the embodiments is merely one exemplary of the embodiments in practicing the present invention, and the technical scope of the present invention should not be construed as limiting by these. In other words, the present invention may be embodied in various forms without departing from the gist thereof or the main characteristics thereof.

For example, in the above embodiment, only when sensory glossiness (L) is 1 or more, spatial resolution is changed when the value of A/B is a predetermined range, and when sensory glossiness (L) is less than 1, local gonio-reflection characteristics α which is acquire initially is adopted as texture information. On the other hand, when sensory glossiness (L) is less than 1, it may have a step of determining whether or not A/B is larger than 0.8, and when A/B is larger than 0.8, it may have a step of changing spatial resolution (A) so that A/B is 0.8 or less (so as to satisfy Equation (3)). In this way, when local gonio-reflection characteristics is acquired for images where gloss is not very high, it is also possible to suppress noises caused by too high a spatial resolution, and so on.

$$A/B \leq 0.8 \qquad \text{Formula (3)}$$

In addition, in the above embodiment, the average value of sensory glossiness (L) for each pixel is calculated to be sensory glossiness (L) of the image, and it is determined whether or not spatial resolution is changed based on sensory glossiness (L) of the image. On the other hand, for each small region obtained by dividing one image, sensory glossiness (L) (the mean value of sensory glossiness (L) of pixel constituting small region) may be calculated, and spatial resolution may be changed for each image.

For example, for a dot-image having a small region having a lower gloss (or a small region formed solely from a process color) and another small region having a higher gloss, spatial resolution for acquiring local gonio-reflection characteristics may be changed (increased) only for the small region having a higher gloss, so that the local gonio-reflection characteristics can be acquired at a lower cost and in a simpler manner. Note that the size of the small region is not particularly limited, and may be a small region comprising a plurality of dots, or a single small region can be constituted by a single dot.

In addition, in the above embodiment, resolution acquiring apparatus enlarges and observes dot-image to acquire resolution of dot-image, but resolution embedded in the image data used when forming dot-image may be used instead.

In addition, in the embodiment, a BRDF is acquired as a local gonio-reflection characteristics (distribution of lightness of reflected light), but other local gonio-reflection characteristics represented in forms other than BRDF may be used instead.

In addition, in the above embodiment, XYZ stimulus value are acquired from spectral reflectivity included in a local gonio-reflection characteristics and a spectrum of a measurement light, but a stimulus value may be acquired by other method. For example, XYZ stimulus value may be directly acquired from the image. Alternatively, XYZ stimulus value may be calculated from BRDF. Note that as in the embodiment, by acquiring XYZ stimulus value from spectral reflectivity included in a local gonio-reflection characteristics and a spectrum of a measurement light, difference in the light source for irradiating the dot-image (for example, the difference between when viewing the dot-image under a fluorescent lamp and when viewing the dot-image under sunlight) can be reflected to the displayed image by changing the spectrum of the measuring light, and thus preferred.

EXAMPLES

Hereinafter, specific examples of the present invention will be described together with comparative examples, but the present invention is not limited thereto.

1. Preparation and Preparation of Materials for Metallic Layer

1-1. Preparation of Metallic Ink 1 (M1)

1-1-1. Preparation of Metal Nano Particles Dispersions

To a 1 L separable flask having a tabular stirring blade and a baffle plate, 8.6 g of DISPERBYK-190 (manufactured by Byk Chemie Co., Ltd.), and 269 g of ion-exchanged water were charged, and stirring was performed to dissolve DISPERBYK-190. Subsequently, 55 g of silver nitrate dissolved in 269 g of ion-exchanged water was charged into the separable flask while stirring. Further, stirring was performed by adding 70 g of ammonia water, and thereafter, the separable flask was placed in a water bath and heated and stirred until the temperature of the solution was stable to 80° C. Thereafter, 144 g of dimethylaminoethanol was added to the separable flask, and stirring was continued for 6 hours while further maintaining at 80° C., thereby obtained a reaction solution containing metal nano particles.

The obtained reaction solution was placed in a stainless cup, and 2 L of ion-exchanged water was further added, and then the pump was operated to perform ultrafiltration. When the solution in the stainless steel cup decreased, ion-exchanged water was again put in, and the purification was repeated until the conductivity of the filtrate became 100 μS/cm or less. Thereafter, the filtrate was concentrated to obtain a metal nano particles dispersion having a solid content of 30 wt %.

In the ultrafiltration device, an ultrafiltration module AHP1010 (manufactured by Asahi Kasei Co., Ltd., fractionated molecular weight: 50000, number of membranes used: 400) and a tube pump (manufactured by Masterflex Co., Ltd.) were connected by a Tygon tube were used.

When the particle diameter of metal nano particles contained in metal nano particles dispersion was measured by the procedure of the, average particle size was 43 nm.

1) A metal nano particles dispersion was applied on a glass plate, and then vacuum-degassed to volatilize the solvent components to obtain a sample. The dispersions of the obtained samples were observed by SEM using a scanning electron microscope JSM-7401F (manufactured by Nippon Electronics Co., Ltd.) to measure the particle sizes of arbitrarily 300 metallic particles.

2) Based on the obtained measure data, a particle size distribution on a volume basis was obtained using an image processing soft Image J, and the D50 (median diameter) thereof was defined as an average particle diameter (volume average particle diameter) in terms of volume.

1-1-2. Preparation of Ink Jet Ink

The following components were mixed in the following composition so that the total amount was 100 parts by mass to obtain metallic ink 1 (M1)

| | |
|---|---|
| Aqueous dispersion of silver nanoparticle composite | 14.35 parts by mass |
| Cross-linking agent (manufactured by Aqua BI200, LANXESS Co., Ltd.) | 0.025 parts by mass |
| pH-adjusting agent (aqueous $Na_2CO_3$ 0.01M) | 8.00 parts by mass |
| Surfactant (F-477, manufactured by DIC Corporation) | 0.10 parts by mass |
| Triethylene glycol monobutyl ether | 37.00 parts by mass |
| Hexylene glycol | 4.00 parts by mass |
| Water | remainder |

1-2. Preparation of Metallic Ink 2 (M2)

A metallic ink 2 (M2) was obtained in the same manner as in the preparation of the metallic ink 1 (M1) except that 1.0 parts by mass of VC-10 (manufactured by Nippon Vie Poval Co., Ltd., binder resin) was added.

1-3. Preparation of Metallic Ink 3 (M3)

As a metallic ink 3 (M3) containing an aluminum pigment, a solvent ink for ink jet (product number: SB11021) manufactured by ECKART Corporation was prepared.

When the aluminum pigment used in the metallic ink 3 (M3) was observed by microscope, its shape was a flat shape, and average particle size was 1.5 m and the average thickness was 100 nm.

1-4. Preparation of Metallic Ink 4 (M4)

As a metallic ink 4 (M4) containing an aluminum pigment, an ink jet UV ink (product number: UV31023) manufactured by ECKART was prepared.

When the aluminum pigment used in the metallic ink 4 (M4) was observed by microscope, its shape was a flat shape, and average particle size was 1.5 μm and the average thickness was 100 nm.

1-5. Preparation of Metal Powder 5 (M5)

As a powder (M5) having a metallic gloss, a metashine ME2025PS manufactured by Nippon Sheet Glass Co., Ltd., was prepared.

When the metallic powder (M5) was observed by microscope, the shape thereof was a flat shape, and average particle size was 25 μm and the average thickness was 1.5 μm.

1-6. Preparation of Metal Foil (M6)

As a metal foil (M6) having a metallic gloss, a gold-colored foil (No. 3) manufactured by Murata Gold Foil Co., Ltd., was prepared.

2. Preparation of Materials for Under Layer and Overcoat

2-1. Preparation of Under Layer Agent 1 (UL1)

The following components were mixed in the following compositions to obtain under layer agent 1 (UL1)

| | |
|---|---|
| Polyethylene glycol #400 diacrylate | 36.9 parts by weight |
| 4EO-modified pentaerythritol tetraacrylate | 23 parts by weight |
| 6EO-modified trimethylolpropane triacrylate | 31 parts by weight |
| Photopolymerization initiator (diphenyl(2,4,6-trimethylbenzoyl)phosphine oxide (DAROCUR TPO, manufactured by BASF) | 7 parts by weight |
| Sensitizing aid (p-dimethylaminobenzoic acid ethyl ester (KayacureEPA, manufactured by Nippon Kayaku Co., Ltd.) | 2 Parts by weight |

-continued

| | |
|---|---|
| Surfactant (KF-352, manufactured by Shin-Etsu Chemical Industry Co., Ltd.) | 0.1 parts by weight |

2-2. Preparation of Under Layer Agent 2 (UL2)

Toner particles were synthesized by the following procedure to obtain under layer agent 2 (UL2).

(a) Preparation of the Core Portion

To a reaction vessel fitted with a stirring device, a temperature sensor, a cooling tube, and a nitrogen introducing device, the following components were charged and stirred in the following amounts. After adjusting the temperature of the obtained mixed liquid to 30° C., 5 mol/liter of a sodium hydroxide solution was added to the mixed liquid to adjust its pH to 8 to 11

| | |
|---|---|
| Styrene-acrylic resin particle dispersion (solids concentration: 25.7%) | 420.7 parts by mass |
| Ion exchange water | 900 parts by mass |
| Dispersion liquid for black | 300 parts by mass |

Then, an aqueous solution obtained by dissolving 2 parts by mass of magnesium chloride-6 hydrate in 1000 parts by mass of ion-exchanged water was added to the mixed solution at 30° C. for 10 minutes under stirring. The temperature rise of the mixed liquid was started after standing for 3 minutes, and the temperature of the mixed liquid was increased to 65° C. over 60 minutes, and the association of particles in the mixed liquid was performed. In this state, the particle diameter measure of the associated particles was performed using a multisizer 3 manufactured by Coulter Co., Ltd., and when the volume-based median diameter of the associated particles became 5.8 µm, an aqueous solution in which 40.2 parts by mass of sodium chloride was dissolved in 1000 parts by mass of ion-exchanged water was added to the mixed liquid to stop the association of the particles.

After stopping the association, further, to produce a core portion by continuing the fusion of the associated particles by performing heating stirring for 1 hour with the liquid temperature at 70° C., as a ripening treatment. The mean circularity of the core portion was measured with FPIA2100 (FPIA manufactured by Sysmeck Co., Ltd., "FPIA" is the company's registered trademark), and the result was 0.912.

(b) Fabrication of the Shell

Next, 50 parts by mass of the polyester resin particle dispersion (solid concentration 25.7%) was added to the mixed liquid at 65° C., and further, an aqueous solution obtained by dissolving 2 parts by mass of magnesium chloride-6 hydrate in 1000 parts by mass of ion-exchanged water was added to the mixed liquid over 10 minutes. Thereafter, the mixed liquid was heated to 70° C., and stirring was performed for 1 hours. After fusing the resin particles for shell to the surface of the core portion in this way, the shell was formed by performing aging treatment for 20 minutes at 75° C.

Thereafter, an aqueous solution in which 40.2 parts by mass of sodium chloride was dissolved in 1000 parts by mass of ion-exchanged water was added to stop the formation of a shell. In addition, it was cooled to 30° C. at a rate of 8° C./min. The produced particles were filtered and repeatedly washed with ion-exchanged water at 45° C., and then dried with warm air at 40° C., thereby producing black toner base particles having a shell covering the surface of the core portion.

(c) Process of Adding an External Additive

The following external additive was added to the black toner base particles, and an external addition treatment was performed while stirring with a Henschel mixer manufactured by Nippon Coke Industry Co., Ltd., to prepare black toner particles.

Silica fine particles subjected to hexamethylsilazane treatment 0.6 parts by mass N-octylsilane treated titanium dioxide fine particles 0.8 parts by mass The external addition (stirring) treatment by the Henschel mixer was performed under conditions of a peripheral speed of a stirring blade of 35 m/sec, a treatment temperature of 35° C., and a treatment time of 15 minutes. The silica fine particles of the external additive had a median diameter of 12 nm on a volume basis, and the titanium dioxide fine particles had a median diameter of 20 nm on a volume basis.

Preparation of Developer

A ferrite carrier particle having a volume average particle size of 40 µm, which was coated with a copolymer of methyl methacrylate and cyclohexyl methacrylate, was mixed with the black toner particles in an amount such that the toner concentration became 6% by mass to prepare a black developer, which was used as a under layer agent 2 (UL2).

2-3. Preparation of Overcoat Agent 1 (OC1)

Mixtures of the same composition as under layer agent 1 (UL1) were used as overcoat agent 1 (OC1).

3. Imaging

Using each of the materials described above, an image was formed on the following media under the following conditions.

3-1. Media

The following media were used:
Media 1 (P1): OK topcoat (basis weight: 128 g/m$^2$, manufactured by Oji Paper Co., Ltd.), and
Media 2 (P2): Photograph gloss Paper (basis weight: 255 g/m$^2$, manufactured by Seiko Epson Co., Ltd.).

3-2. Formation of Images

The type of media, the presence or absence of under layer and the type of material for under layer used for formation, the type of material for metallic layer used for forming metallic layer, the presence or absence of overcoat and the type of material for overcoat used for forming, and resolution at the time of printing were altered as described in table 1 to form Images 1 to 8.

The under layer, metallic layer and overcoat were formed by the following procedures, respectively.

3-2-1. Forming Under Layer Using Under Layer Agent 1 (UL1)

An ink jet type image forming device having an ink tank, an ink supply pipe, an ink supply tank placed immediately before an ink jet head, a filter, and a piezo type ink jet head (KM1024i, manufactured by Konica Minolta Co., Ltd.) having a droplet volume of 7 pl, in this order from the upstream side to the downstream side where ink flows, was prepared. The ink tank of the image forming device was loaded with under layer agent 1 (UL1) and driven at a printing speed of 0.5 m/sec and an injection frequency of 10.5 kHz to eject droplets of under layer agent 1 (UL1) and land on the medium. The print resolution was set to 360 dpi or 720 dpi, and as the print data, dot-image data spaced apart from each other by one pixel was used as the input data.

After landing on the medium, ultraviolet rays (395 nm, 8 W/cm$^2$) were irradiated from an LED lamp equipped with a water cooling unit manufactured by Phoseon Technology to form a under layer formed by a aggregation of dots in which under layer agent 1 (UL1) was cured. The distance from the lamp to the surface of under layer agent 1 (UL1) landed on the medium was set to 20 mm. The formed Under layer had a clear (transparent) color.

3-2-2. Forming Under Layer Using Under Layer Agent 2 (UL2)

A remodeling machine of an electrophotographic image forming device (AccurioPress 6120, manufactured by Konica Minolta Co., Ltd., "AccurioPress" is a registered trademark of the company) was prepared. The imaging device was loaded with under layer agent 2 (UL2) (black developer), and a 2 cm×2 cm square patch image was formed on the medium, and a toner image (resin-based image) having the patch image was output on the medium. Note that the print resolution was set at 600 dpi. the patch-image area at the resin-based image had a black color.

3-2-3. Forming Metallic Layer with Metallic Ink 1 (M1) to Metallic Ink 3 (M3)

The ink-jet apparatus used to form under layer with under layer agent 1 (UL1) was loaded with any of metallic ink 1 (M1) to metallic ink 3 (M3) and driven at a printing speed of 0.5 m/sec and an injection frequency of 10.5 kHz to eject droplets of metallic ink and land on the surface of under layer. After landing, a metallic ink was dried at 60° C. for about 10 minutes to form a metallic layer formed by aggregation of dots formed by a metallic ink. Droplet ejection was performed only once per dot.

The abundance of metal nano particles contained in metallic layer, which is calculated from the component ratio obtained by excluding the solvent component from the total amount of ink, is as follows.

Metallic ink 1 (M1): 97% by mass
Metallic ink 2 (M2): 79% by mass
Metallic ink 3 (M3): 77% by mass

3-2-4. Forming Metallic Layer Using Metallic Ink 4 (M4)

The ink jet type imaging device used to form under layer with under layer agent 1 (UL1) was loaded with metallic ink 4 (M4) and driven at a printing speed of 0.5 m/sec and an injection frequency of 10.5 kHz to eject droplets of metallic ink and land on the surface of under layer. After landing, ultraviolet rays (395 nm, 8 W/cm$^2$) were irradiated from an LED lamp with a water cooling unit manufactured by Phoseon Technology to form a metallic layer. The distance from the lamp to the surface of the metallic ink 4 (M4) landed on the media was set at 20 mm. The abundance of the metallic particles contained in the formed metallic layer was 8% by mass.

3-2-5. Forming Metallic Layer Using Metallic Powder (M5)

On a hot plate heated to 85° C., a medium on which under layer by under layer agent 2 (UL2) was formed was placed while the patch image was placed on the top, and a metal powder 5 (M5) was scattered on the patch image, and the surface of the patch image of the resin-based image was rubbed with a sponge roller. The pressing force at the time of rubbing was about 10 kPa. After rubbing, the resin-based image was cooled under room temperature conditions, and then the remaining metallic powder 5 (M5) was removed from the surface of the patch image by a brush to form a metallic layer.

3-2-6. Forming an Overcoat Using an Overcoat Agent 1 (OC1)

The ink jet type imaging device used to form under layer by under layer agent 1 (UL1) was loaded with an overcoat agent 1 (OC1) and driven at a printing speed of 0.5 m/sec and an injection frequency of 10.5 kHz to eject droplets of the overcoat agent 1 (OC1) and land on the surface of metallic layer. After landing, ultraviolet rays (395 nm, 8 W/cm$^2$) were irradiated from an LED lamp with a water cooling unit manufactured by Phoseon Technology to form an overcoat. The distance from the lamp to the surface of the overcoat agent 1 (OC1) landed on the medium was set to 20 mm.

3-2-7. Forming Metallic Layer Using Metallic Foil (M6)

A metal foil (M6), a medium, and a hot stamp plate (5 cm×5 cm square) were set in a hot stamp machine (V-08LC) manufactured by Navitas Co., Ltd., and a hot stamp was performed in a warmed state at 90° C., and a foil image of 5 cm×5 cm was formed on the medium.

TABLE 1

| Image No. | Media | Under Layer (Material, Presence/ absence) | Metallic layer | | | | Over Layer (Material, Presence/ absence) | Print Resolution (dpi) |
| | | | Material | Shape of glossy colorant | D50 (nm) | Content ratio (wt %) | | |
| --- | --- | --- | --- | --- | --- | --- | --- | --- |
| 1 | P1 | UL1 | M1 | Spherical | 43 | 97 | None | 360 |
| 2 | P1 | UL1 | M1 | Spherical | 43 | 97 | None | 720 |
| 3 | P1 | UL1 | M1 | Spherical | 43 | 97 | OC1 | 720 |
| 4 | P1 | UL1 | M2 | Spherical | 43 | 79 | None | 360 |

TABLE 1-continued

| Image No. | Media | Under Layer (Material, Presence/absence) | Metallic layer Material | Metallic layer Shape of glossy colorant | Metallic layer D50 (nm) | Metallic layer Content ratio (wt %) | Over Layer (Material, Presence/absence) | Print Resolution (dpi) |
|---|---|---|---|---|---|---|---|---|
| 5 | P2 | None | M3 | Flat | — | — | None | 360 |
| 6 | P1 | UL1 | M3 | Flat | — | — | None | 360 |
| 7 | P2 | None | M4 | Flat | — | — | None | 720 |
| 8 | P1 | UL2 | M5 | Flat | — | — | None | 600 |
| 9 | P1 | None | M6 | — | — | — | None | — |

4. Measuring Images

4-1. Measurement of Local Gonio-Reflection Characteristics

Local gonio-reflection characteristics of images 1 to 8 was measured by a local gonio-reflection characteristics-acquiring apparatus with a hyperspectral camera (NH-9, manufactured by Eva Japan) attached to a goniophotometer automated measuring device (GP-1, manufactured by Nikka Electrophotometry Co., Ltd.). For the lens of the hyperspectral camera, a SV-3514H manufactured by VS Technology Corporation, was used.

Each of the images 1 to 8 was installed in the goniophotometer automated measuring device, and the incident light was irradiated at an incident angle of 45° from a xenon light source (LAX-C100, manufactured by Asahi Spectrum Co., Ltd.), and reflect intensity of −20° to 80° was measured in 5° increments in the range of −20° to 0°, in 2° increments in the range of 0° to 30°, in 1° increments in the range of 30° to 60°, and in 2° increments in the range of 60° to 80°. Lightness (L*) and spectral reflectivity at the respective pixel of the images were thus acquired.

At this time, spatial resolution at the time of measurement was changed by changing the distance between the images and the hyperspectral camera. Table 2 shows the relation between the distance between the images and the lenses under the measure condition and spatial resolution at the time of measurement.

TABLE 2

| Measurement condition No. | Distance between image and lens (mm) | Spatial resolution (ppi) |
|---|---|---|
| S1 | 200 | 3797 |
| S2 | 250 | 3038 |
| S3 | 400 | 1899 |
| S4 | 500 | 1266 |
| S5 | 600 | 1266 |
| S6 | 800 | 949 |
| S7 | 1000 | 759 |
| S8 | 1200 | 633 |
| S9 | 1500 | 506 |

4-2. Calculation of Sensory Glossiness

The shapes of the graphs obtained by plotting light receiving angle (θ) on the abscissa and lightness (L*) on the ordinate for L* of each pixel measured by the goniophotometer automated measuring device were fitted to one Lorentzian function. Then, a height of a peak (H), a height of a base (B) and a half width of a peak (W) were determined by the least squares method using Solver (registered trade mark) equipped in Excel (registered trade mark manufactured by Microsoft). Then, the obtained H, B and W were substituted into Equation (1) to obtain sensory glossiness (L) of pixel in question. Then, sensory glossiness (L) of the images was obtained by obtaining sensory glossiness (L) for all pixel as well and summing and averaging them.

$$L = \mathrm{Log}((H-B)/W) \quad \text{Equation (1)}$$

The obtained sensory glossiness (L) for each combination of images and measurement conditions are shown in Table 3.

TABLE 3

| Experiment No. | Image No. | Measurement Condition No. | Sensory glossiness L |
|---|---|---|---|
| 1 | 1 | S7 | 1.9 |
| 2 | 1 | S6 | 1.9 |
| 3 | 1 | S5 | 1.9 |
| 4 | 1 | S4 | 1.9 |
| 5 | 1 | S2 | 1.9 |
| 6 | 1 | S1 | 1.9 |
| 7 | 2 | S9 | 1.9 |
| 8 | 2 | S8 | 1.9 |
| 9 | 2 | S6 | 1.9 |
| 10 | 2 | S4 | 1.9 |
| 11 | 3 | S4 | 1.9 |
| 12 | 4 | S4 | 1.7 |
| 16 | 5 | S4 | 1.1 |
| 17 | 6 | S4 | 1.3 |
| 18 | 7 | S4 | 0.9 |
| 19 | 8 | S7 | 1.5 |
| 20 | 8 | S6 | 1.5 |
| 21 | 8 | S5 | 1.5 |
| 22 | 9 | S2 | 2.1 |
| 23 | 9 | S4 | 2.1 |
| 24 | 9 | S8 | 2.1 |

5. Creation of Display Data

By the equation shown in Equation (4), pixel of spectrum S (λ), color-matching function x⁻ (λ), and spectral reflectivity R (λ) of the light source at each pixel were integrated to obtain XYZ stimulus value of each pixel.

[Mathematical formula 3]

$$X = K\int_{380}^{780} S(\lambda)\bar{x}(\lambda)R(\lambda)d\lambda$$

$$Y = K\int_{380}^{780} S(\lambda)\bar{y}(\lambda)R(\lambda)d\lambda$$

$$Z = K\int_{380}^{780} S(\lambda)\bar{z}(\lambda)R(\lambda)d\lambda \quad \text{Formula (4)}$$

the XYZ stimulus value at each pixel was converted into a sRGB signal value for display by the formula shown in Equation (5)

[Mathematical formula 4]

$$\begin{pmatrix} R' \\ G' \\ B' \end{pmatrix} = \begin{pmatrix} 3.241 & -1.537 & -0.499 \\ -0.969 & 1.876 & 0.042 \\ 0.056 & -0.204 & 1.057 \end{pmatrix} \begin{pmatrix} X \\ Y \\ Z \end{pmatrix},$$

Formula (5)

$$\begin{pmatrix} sR \\ sG \\ sB \end{pmatrix} = \begin{pmatrix} R'^{0.45} \\ G'^{0.45} \\ B'^{0.45} \end{pmatrix},$$

6. Evaluation

For images for which local gonio-reflection characteristics was acquired in the respective conditions (see Table 3), the obtained display data (sRGB signal value) was outputted on a display (color management monitor, model number: manufactured by CG2730-Z, Eizo Co., Ltd.) which was calibrated in advance, and the following evaluations were performed.

6-1. Brightness Sensitivity (Dark Chamber Environment)

Twenty randomly selected men and women (subjects) in their twenties age gazed on a monitor on which the display data was displayed in a dark chamber for 10 seconds. The monitoring brightness at this time was set to 80 cd/m². Then, the ratio of the number of respondents who answered that the image displayed on the monitor had a glossy feeling was calculated and recorded as a score. Incidentally, the score of 50 or more was accepted.

6-2. Reproductivity (Dark Chamber Environment)

Twenty randomly selected men and women (subjects) in their twenties age were subjected gazed on a monitor on which the display data which was subject to rendering was displayed under D50 light source conditions for 10 seconds. The monitoring brightness at this time was set to 80 cd/m². Under D50 light sources in a standard light source device (Judge II) installed in a dark chamber environment, a paper (original image) from which the display data was obtained was also represented for the same subject. After comparing these, scores was recorded by calculating the ratio of the number of respondents responding that the image displayed on the display had a reproductivity of the original image. Incidentally, the score of 50 or more was accepted.

6-3. Bright Sensitivity (Bright Chamber Environment)

Evaluation was performed in the same manner as in "6-1. Brightness Sensitivity (Dark Chamber Environment)", except that a high-color-rendering fluorescent lamp (FL20S N-EDL-NU, manufactured by Hitachi, Ltd.) was attached as an indoor light source, and further, the monitor brightness was set to 120 cd/m².

6-4. Reproductivity (Bright Chamber Environment)

Evaluation was performed in the same manner as in "6-2. Reproductivity (Dark Chamber Environment)", except that a high-color-rendering fluorescent lamp (FL20S N-EDL-NU, manufactured by Hitachi, Ltd.) was attached as an indoor light source, and further, the monitor brightness was set to 120 cd/m².

The results of the evaluation in each experiment are shown in Table 4

TABLE 4

| Experiment No. | | Image No. | Measurement Condition No. | Sensory Glossiness | Spatial Resolution (A) (ppi) | Image Resolution (B) (dpi) | A/B | Evaluation | | | |
|---|---|---|---|---|---|---|---|---|---|---|---|
| | | | | | | | | Dark Chamber | | Bright Chamber | |
| | | | | | | | | Bright Sebsitivity | Reproductivity | Bright Sebsitivity | Reproductivity |
| 1 | Example | 1 | S7 | 1.9 | 759 | 360 | 2.1 | 95 | 80 | 90 | 80 |
| 2 | Example | 1 | S6 | 1.9 | 949 | 360 | 2.6 | 95 | 85 | 90 | 80 |
| 3 | Example | 1 | S5 | 1.9 | 1266 | 360 | 3.5 | 100 | 80 | 95 | 80 |
| 4 | Example | 1 | S4 | 1.9 | 1899 | 360 | 5.3 | 95 | 75 | 90 | 75 |
| 5 | Example | 1 | S2 | 1.9 | 3038 | 360 | 8.4 | 100 | 55 | 90 | 55 |
| 6 | Comparative | 1 | S1 | 1.9 | 3797 | 360 | 10.5 | 90 | 40 | 90 | 40 |
| 7 | Comparative | 2 | S9 | 1.9 | 506 | 720 | 0.7 | 90 | 45 | 85 | 40 |
| 8 | Example | 2 | S8 | 1.9 | 633 | 720 | 0.9 | 95 | 60 | 90 | 55 |
| 9 | Example | 2 | S6 | 1.9 | 949 | 720 | 1.3 | 95 | 75 | 90 | 75 |
| 10 | Example | 2 | S4 | 1.9 | 1266 | 720 | 1.8 | 95 | 80 | 95 | 75 |
| 11 | Example | 3 | S4 | 1.9 | 1266 | 720 | 1.8 | 100 | 85 | 90 | 80 |
| 12 | Example | 4 | S4 | 1.7 | 1266 | 360 | 3.5 | 80 | 80 | 80 | 80 |
| 13 | Example | 5 | S4 | 1.1 | 1266 | 360 | 3.5 | 65 | 85 | 50 | 50 |
| 14 | Example | 6 | S4 | 1.3 | 1266 | 360 | 3.5 | 65 | 80 | 50 | 55 |
| 15 | Comparative | 7 | S4 | 0.9 | 1266 | 720 | 3.5 | 25 | 85 | 5 | 65 |
| 16 | Reference | 7 | S9 | 0.9 | 506 | 720 | 0.7 | 25 | 85 | 5 | 65 |
| 17 | Example | 8 | S7 | 1.5 | 759 | 600 | 1.3 | 85 | 70 | 80 | 70 |
| 18 | Example | 8 | S6 | 1.5 | 949 | 600 | 1.6 | 80 | 75 | 80 | 70 |
| 19 | Example | 8 | S5 | 1.5 | 1266 | 600 | 2.1 | 85 | 80 | 80 | 75 |
| 20 | Example | 8 | S3 | 1.5 | 1899 | 600 | 3.2 | 85 | 80 | 80 | 75 |
| 21 | Example | 8 | S1 | 1.5 | 3797 | 600 | 6.3 | 85 | 80 | 80 | 70 |
| 22 | Reference | 9 | S2 | 2.1 | 3038 | — | — | 95 | 80 | 90 | 80 |
| 23 | Reference | 9 | S4 | 2.1 | 1266 | — | — | 95 | 80 | 90 | 80 |
| 24 | Reference | 9 | S8 | 2.1 | 633 | — | — | 95 | 80 | 90 | 80 |

From these experimental results, it can be seen that, for dot-image in which sensory glossiness (L) shown in equation (1) below is 1.0 or more, reproductivity of the image displayed on the display increases when spatial resolution (A) at the time of acquiring local gonio-reflection characteristics and resolution (B) of the image satisfy the following formula (2).

$$L = \text{Log}((H-B)/W) \qquad \text{Equation (1)}$$

$$0.8 < A/B < 10 \qquad \text{Formula (2)}$$

Dot-image (Image 7), in which sensory glossiness (L) is less than 1.0, reproductivity was high even when the spatial resolution (A) when local gonio-reflection characteristics was acquired was low, and reproductivity did not change depending on the change of the spatial resolution (A) (Experiment 15 to Experiment 16).

Also, foil images that were not dot-image showed higher reproductivity even when the spatial resolution (A) when local gonio-reflection characteristics was acquired was low, and reproductivity did not change depending on the change of the spatial resolution (A) (Experiments 22-24).

INDUSTRIAL APPLICABILITY

According to the present invention, there is provided a method of acquire of local gonio-reflection characteristics, wherein an image having a higher gloss can be displayed on a display at a higher reproductivity Therefore, it is expected that the present invention will facilitate communication and sharing of information about images with higher gloss, such as in the printing and advertising industries.

Although embodiments of the present invention have been described and illustrated in detail, the disclosed embodiments are made for purposes of illustration and example only and not limitation. The scope of the present invention should be interpreted by terms of the appended claims.

What is claimed is:

1. Local gonio-reflection characteristics-acquiring method for acquiring local gonio-reflection characteristics of an image which is aggregation of dots,
   wherein sensory glossiness (L) of the image determined by equation (1) is 1.0 or more, the sensory glossiness (L) being determined based on a height of a peak (H), a height of a base (B) and a half width of a peak (W) of a distribution information of lightness with respect to light receiving angle, and the distribution information being obtained by measuring reflected light of a measuring light irradiated into the image, and
   wherein the local gonio-reflection characteristics is acquired with a spatial resolution (A), wherein when the spatial resolution (A) is a spatial resolution when the local gonio-reflection characteristics is acquired and when the resolution (B) represents a distribution information of the dots within a region where the sensory glossiness (L) being 1.0 or more, the spatial resolution (A) and the resolution (B) satisfying formula (2), $$L = \text{Log}((H-B)/W) \qquad \text{Equation (1)}$$

$$0.8 < A/B < 10 \qquad \text{Formula (2)}$$

2. The local gonio-reflection characteristics-acquiring method according to claim 1, wherein for an image wherein said sensory glossiness (L) is less than 1.0, the local gonio-reflection characteristics is acquired with a spatial resolution (A) satisfying Formula (3), $$A/B \leq 0.8 \qquad \text{Formula (3)}$$

3. The local gonio-reflection characteristics-acquiring method according to claim 1, wherein a local gonio-reflection characteristics represented by Bidirectional Reflectance Distribution Function (BRDF) is acquired.

4. The local gonio-reflection characteristics-acquiring method according to claim 1, wherein the image has a laminated structure in which imaging medium, under layer, and metallic layer containing glossy colorant are laminated in this order.

5. The local gonio-reflection characteristics-acquiring method according to claim 4, wherein the glossy colorant is metal nano particles.

6. The local gonio-reflection characteristics-acquiring method according to claim 5, wherein the metal nano particles has an average particle size (D50) of 10 nm or more and 80 nm or less.

7. The local gonio-reflection characteristics-acquiring method according to claim 5, wherein the metallic layer has 80% by mass or more of the metal nano particles based on total mass of the metallic layer.

8. The local gonio-reflection characteristics-acquiring method according to claim 4, wherein the glossy colorant is a flat-shaped particle.

9. The local gonio-reflection characteristics-acquiring method according to claim 8, wherein the flat-shaped particles are particles having a thickness of 0.2 μm or more and 3.0 μm or less.

10. The local gonio-reflection characteristics-acquiring method according to claim 4, wherein the glossy colorant comprises a metal or a metal oxide.

11. An image processing method comprising:
    calculating a stimulus value representing an appearance of an image from local gonio-reflection characteristics obtained by the local gonio-reflection characteristics-acquiring method according to claim 1.

12. The image processing method according to claim 11, wherein the stimulus value is calculated using a spectral reflectivity contained in local gonio-reflection characteristics and a spectrum of measurement light.

13. The image processing method according to claim 11, further comprising converting the calculated stimulus value into a signal value for displaying the image on a display.

14. A image display method comprising:
    displaying an image on a display using a signal value converted by the image processing method according to claim 13.

15. A local gonio-reflection characteristics-acquiring apparatus for performing the local gonio-reflection characteristics-acquiring method according to claim 1, comprising:
    a local gonio-reflection characteristics-acquiring section which acquires a local gonio-reflection characteristics of an image, and
    a resolution changing section which changes, when acquiring the local gonio-reflection characteristics of an image having the sensory glossiness (L) being 1.0 or more, a spatial resolution (A) of the local gonio-reflection characteristics-acquiring section such that the spatial resolution (A) and the resolution (B) satisfies the Formula (2).

16. The local gonio-reflection characteristics-acquiring apparatus according to claim 15, wherein the resolution changing section which changes, when acquiring the local gonio-reflection characteristics of an image having the sensory glossiness (L) being less than 1.0, a spatial resolution (A) of the local gonio-reflection characteristics-acquiring section such that the spatial resolution (A) and the resolution (B) satisfies the Formula (3), $$A/B \leq 0.8 \qquad \text{Formula (3)}$$

17. The local gonio-reflection characteristics-acquiring apparatus according to claim 15, wherein the resolution changing section changes a measurement distance by local gonio-reflection characteristics-acquiring section.

18. A non-transitory computer-readable recording medium storing therein an image data setting program for an image data setting apparatus capable of setting image data related to a foil forming image, the program causing a computer to perform:
acquiring local gonio-reflection characteristics of an image which is aggregation of dots,
wherein sensory glossiness (L) of the image determined by equation (1) is 1.0 or more, the sensory glossiness (L) being determined based on a height of a peak (H), a height of a base (B) and a half width of a peak (W) of a distribution information of lightness with respect to light receiving angle, and the distribution information being obtained by measuring reflected light of a measuring light irradiated into the image, and
wherein the local gonio-reflection characteristics is acquired with a spatial resolution (A), wherein when the spatial resolution (A) is a spatial resolution when the local gonio-reflection characteristics is acquired and when the resolution (B) represents a distribution information of the dots within a region where the sensory glossiness (L) being 1.0 or more, the spatial resolution (A) and the resolution (B) satisfying formula (2), $$L = \mathrm{Log}((H-B)/W) \qquad \text{Equation (1)}$$

$$0.8 < A/B < 10 \qquad \text{Formula (2)}$$

* * * * *